(12) United States Patent
Wang et al.

(10) Patent No.: US 10,875,077 B2
(45) Date of Patent: Dec. 29, 2020

(54) LINEAR APPARATUS FOR FORMING A CAN OPENING

(71) Applicant: SUZHOU SLAC PRECISION EQUIPMENT CO., LTD, Jiangsu (CN)

(72) Inventors: Bingsheng Wang, Suzhou (CN); Lingguang Kong, Suzhou (CN); Bingxin Liu, Suzhou (CN)

(73) Assignee: SUZHOU SLAC PRECISION EQUIPMENT CO., LTD, Suzhou (JP)

( * ) Notice: Subject to any disclaimer, the term of this patent is extended or adjusted under 35 U.S.C. 154(b) by 187 days.

(21) Appl. No.: 16/067,752

(22) PCT Filed: Dec. 9, 2016

(86) PCT No.: PCT/CN2016/109132
§ 371 (c)(1),
(2) Date: Jul. 2, 2018

(87) PCT Pub. No.: WO2017/118259
PCT Pub. Date: Jul. 13, 2017

(65) Prior Publication Data
US 2019/0001394 A1   Jan. 3, 2019

(30) Foreign Application Priority Data
Jan. 5, 2016 (CN) .......................... 2016 1 0003673

(51) Int. Cl.
*B21D 51/26* (2006.01)
*B21D 43/18* (2006.01)
*B21D 43/12* (2006.01)

(52) U.S. Cl.
CPC ......... *B21D 51/2638* (2013.01); *B21D 43/12* (2013.01); *B21D 43/18* (2013.01); *B21D 51/2692* (2013.01); *B65G 2201/0252* (2013.01)

(58) Field of Classification Search
CPC ............ B21D 51/2638; B21D 51/2615; B21D 51/2623; B21D 51/263; B21D 51/26;
(Continued)

(56) References Cited

U.S. PATENT DOCUMENTS

| 2,250,225 A * | 7/1941 | Hummel | B21D 51/38 228/5.1 |
| 2,643,778 A * | 6/1953 | Socke | B65G 47/24 198/377.04 |

(Continued)

FOREIGN PATENT DOCUMENTS

| CN | 1045044 A | 9/1990 |
| CN | 201807676 U | 4/2011 |

(Continued)

OTHER PUBLICATIONS

Feb. 27, 2017 International Search Report issued in International Patent Application No. PCT/CN2016/109132.

*Primary Examiner* — Teresa M Ekiert
*Assistant Examiner* — Sarkis A Aktavoiukian
(74) *Attorney, Agent, or Firm* — Oliff PLC

(57) ABSTRACT

A linear apparatus for forming a can opening, including: a working tabletop, a plurality of necking machining stations are arranged on the working tabletop; each necking machining station is provided with a can body positioning recess for positioning a can body; the can body positioning recess is internally provided with a vacuum suction hole; a vacuum chamber is arranged below the working tabletop; the vacuum chamber is in communication with the vacuum suction hole; a necking machining device is correspondingly arranged on each necking machining station; further: a moving device, and the moving device acts on the can body positioned in the can body positioning recess and is used for moving the can body on the stations onward by one station. The apparatus has the advantages of simple structure, low cost, small occupied space and convenient maintenance, and is the best choice for manufacturers with low production speed requirements.

8 Claims, 6 Drawing Sheets

(58) Field of Classification Search
CPC .... B21D 51/38; B21D 51/2692; B21D 43/12; B21D 43/18; B21D 19/086; B21D 43/00; B21D 43/145; B65G 2201/0252; B65G 17/36; B65G 21/2027; B65G 21/2036; B65G 17/323; B65G 47/91; B65G 47/912; B65G 47/911; B21K 21/12
USPC .............. 414/752.1, 751.1; 198/689.1, 477.1, 198/867.03, 703.5
See application file for complete search history.

(56) References Cited

U.S. PATENT DOCUMENTS

| | | | | |
|---|---|---|---|---|
| 3,187,876 | A * | 6/1965 | Simpson | B21D 51/2692 198/377.08 |
| 3,318,203 | A * | 5/1967 | Durat | B21D 51/2615 425/356 |
| 4,513,595 | A * | 4/1985 | Cvacho | B21D 51/2638 413/1 |
| 5,042,289 | A * | 8/1991 | Jensen | G01N 3/12 73/40 |
| 5,668,307 | A * | 9/1997 | Wade | G01M 3/226 73/40.7 |
| 5,769,203 | A * | 6/1998 | Marti Sala | B65G 17/32 198/397.01 |
| 8,327,999 | B2 * | 12/2012 | Klaiber | B29C 49/4205 198/470.1 |
| 2007/0166131 | A1 | 7/2007 | Cook et al. | |
| 2012/0042708 | A1 * | 2/2012 | Watkins | B21D 51/2638 72/379.4 |

FOREIGN PATENT DOCUMENTS

| | | | |
|---|---|---|---|
| CN | 102574193 A | 7/2012 | |
| CN | 105499428 A | 4/2016 | |
| CN | 205324547 U | 6/2016 | |
| DE | 2052853 A1 * | 5/1972 | ............... C03B 9/12 |
| JP | 2008-043965 A | 2/2008 | |

* cited by examiner

LINEAR APPARATUS FOR FORMING A CAN OPENING

TECHNICAL FIELD

The present invention relates to an apparatus for forming a can opening of a metal can and the so-called forming a can opening mainly refers to the necking machining of a can opening of a metal can, and also the subsequent processed such as expanded flanging, curling or flaring, etc on the basis of necking machining process.

BACKGROUND OF INVENTION

Metal cans, such as ring-pull cans, are usually made of aluminum and iron, and the structure consists of a can body and a lid (easy open lid). In order to reduce the cost of easy open lid, and to facilitate packing and transportation at the same time, the can bodies of metal cans that are currently circulating on the market will undergo a necking process. The necking structure is the No. 9 as shown in FIG. 1. Furthermore, in order to provide a can body with a lid, the flanging process may be required on the basis of necking; and for the bottle can, the flaring and curling are required.

The necking forming technique is mainly based on the multi-station mold necking, that is, the diameter of can opening is gradually reduced through the multi-mold extrusion process until the finally required neck size is achieved. Taking the necking of mainstream cans from 211 to 202 with neck thickness of 0.148 mm for example, 12 necking processes are required.

In the prior art, the necking equipment is as shown in FIG. 2, the running route of the can is a curvilinear curve, and the entire neck forming equipment is composed of the separate modular forming units and each unit consists of the multiple stations. They are all used to complete the same forming process, and each forming unit comprises the basically identical set of push rod assemblies and mold punch assemblies. They complete the neck forming process of cans under the control of the spatial cams and the conveying starwheels convey the cans to the next forming unit until the can opening size achieves the required shape and size, and finally discharging starwheels discharge the necked cans out of the forming equipment. One of the main features of this kind of equipment is that the production speed is high, but the disadvantage is that the cost of each unit is high. In particular, for the increasingly popular bottle cans, the necking requires at least 30 processes, and it even may require more than 40 processes, so the procurement cost of the entire equipment is very expensive. However, for the production need of bottle cans or aerosol cans, the production lot is not large, so it doesn't require the too high production speed, while it requires the lower cost, which results in the demand for the equipment with low speed and low cost.

DISCLOSURE OF THE INVENTION

The purpose of the present invention is to provide a linear apparatus for forming a can opening to satisfy the need for the low cost apparatus for forming a can opening.

To achieve the above purpose, the first technical solution adopted by the present invention is: a linear apparatus for forming a can opening comprises a working tabletop and a plurality of necking machining stations are arranged on the working tabletop; each necking machining station is provided with a can body positioning recess for positioning a can body, and the positioning recesses for positioning can bodies are arranged in parallel along the axis of can bodies; the can body positioning recess is internally provided with a vacuum suction hole, and a vacuum chamber is provided below the working tabletop, and the vacuum chamber is in communication with the vacuum suction hole;

a necking machining device is correspondingly arranged on each necking machining station and the necking machining device acts on the can opening of the can body positioned in the can body positioning recess; the necking machining device comprises a necking internal mold, a necking external mold sleeved on the outside of the necking internal mold and the necking drive device driving the movement of necking internal mold and necking external mold relative to the can body;

it further comprises a moving device, and the moving device acts on the can body positioned in the can body positioning recess and is used for moving the can body on the stations onward by one station.

In above described technical solution, the necking drive device comprises a external mold punch connected with a necking external mold, an internal mold punch connected with a necking internal mold and two disk cams; the two disk cams connect with the external mold punch and internal mold punch respectively and in a drive way; the disk cams are sleeved on a cam shaft and the cam shaft is connected with a motor at one end in a drive way, and the motor drives the external mold and internal mold to move to the can opening of can body and return through the disk cam, external mold punch and internal mold punch.

Furthermore, the disk cam is a cam working with the external contour surface or the flange contour surface. And the internal and external mold punches corresponding to the cam are provided with rollers, and the rollers are kept in contact with the cam working surface through the spring force for the continuous drive. Alternatively, the disc cam is a disc groove cam, and the external mold punch or internal mold punch corresponding to the cam is provided with rollers, and the rollers are embedded in the groove of disc groove cam for the continuous drive.

In above described technical solution, the necking drive device comprises the mold punches connected with the necking internal mold and necking external mold and the can body punch acting on the can body; a linear power device drives the movement of necking internal mold and necking external mold through the mold and another linear power device drives the can body through the can body punch for the relative movement of can body and necking internal mold and necking external mold.

In above described technical solution, the moving device comprises a conveying belt device and an intermittent drive device, and the conveying belt device includes a closed loop conveying belt and a driving wheel and a driven wheel driving the closed loop conveying belt; a section of rectilinear belt surface on the closed loop conveying belt is superposed on the working tabletop as the conveying surface and the can body positioning recess is fixed on the conveying surface of the closed loop conveying belt; the vacuum suction hole of corresponding can body positioning recess on the closed loop conveying belt is provided with the through hole, while the can body positioning recess of corresponding necking machining station on the working tabletop is provided with the through hole, so when the can body positioning recess is on the necking machining station, the vacuum suction hole is connected with the vacuum chamber through the through hole of the closed loop conveying belt and through hole of working tabletop; the intermittent drive device is connected with the driving wheel to move the can body positioning recess and its positioned can body onward by one station through the closed loop conveying belt.

Furthermore, a plurality of through holes are also arranged between the necking machining stations of the working tabletop, so that the vacuum suction holes of can body positioning recess is connected with the vacuum chamber through the through holes of closed loop conveying belt and through holes of working tabletop when the can body positioning recess is located between the necking machining stations.

In above described technical solution, the moving device comprises a moving action body, and the moving action body is set across and above the can body positioning recess of the necking machining stations, and the moving action body is provided with the pick-up sucking disc or pick-up sucking groove for the can body positioned by the can body positioning recess; in addition, the moving action body is provided with a shifting device to drive the moving action body to move relative to the working tabletop along the arrangement direction of necking machining stations and in the upward and downward direction.

In order to achieve the above purpose, the present invention applies the second technical solution:

A linear apparatus for forming a can opening comprises a working tabletop and two lines of necking machining stations are arranged on two parallel lines along the working tabletop; each necking machining station is provided with a can body positioning recess for positioning a can body, and the positioning recesses for positioning can bodies are arranged in parallel along the axis of can bodies; the can body positioning recess is internally provided with a vacuum suction hole, and a vacuum chamber is provided below the working tabletop, and the vacuum chamber is in communication with the vacuum suction hole;

each necking machining station is provided with a necking machining device, and the necking machining device is located between the can body positioning recess of two lines of necking machining stations, and the necking machining devices of two lines of necking machining stations are one-to-one correspondence;

the necking machining device comprises a necking internal mold, a necking external mold sleeved on the outside of the necking internal mold, a external mold punch connected with a necking external mold and an internal mold punch connected with a necking internal mold; two disk cams are established between each pair of necking machining devices corresponding to the two lines of necking machining stations, and the two disk cams are isodiametric disk cams; in the two isodiametric disk cams, one isodiametric disk cam is corresponding to the external mold punch of two necking machining devices and connected with it in a drive way to form an isodiametric cam; the other isodiametric disk cam is corresponding to the internal mold punch of two necking machining devices and connected with it in a drive way to form an isodiametric cam, too; in addition, the disk cams are sleeved on a cam shaft and the cam shaft is connected with a motor at one end in a drive way, and the motor drives the necking external mold and necking internal mold of two corresponding necking machining devices of the two lines of necking machining stations to move to the can body in the can body positioning recess of respective necking machining station and return through the disk cam;

it further comprises a moving device, and the moving device acts on the can body positioned in the can body positioning recess and is used for moving the can body on the stations onward by one station.

Due to the application of the above described technical solution, the present invention has the following advantages in comparison with the prior art: The invention has the advantages of simple structure, low cost, small occupied space and convenient maintenance, etc, and is the best choice for can body manufacturers with low production speed requirements; in addition, the working stations could be conveniently and arbitrarily extended, added/reduced in the present invention, and the flanging machining station, the curling machining station or the flaring machining station could be added after the necking machining stations if necessary.

In the above figures, 1. working tabletop; 11. vacuum chamber; 12. through hole; 13. through hole; 2. necking machining station; 21. necking machining device; 211. necking internal mold; 212. necking external mold; 213. external mold punch; 214. internal mold punch; 215. disk cam; 216. cam shaft; 217. Motor; 3. can body positioning recess; 31. vacuum suction hole; 4. can body; 5. moving device; 51. conveying belt device; 511. closed loop conveying belt; 5111. through hole; 512. driving wheel; 513. driven wheel; 52. intermittent drive device; 53. moving action body; 531. pick-up sucking groove; 6. flanging machining station; 61. flanging machining device; 7. loading starwheel; 8. unloading starwheel; 9. necking area.

SPECIFIC EMBODIMENT

With reference to the accompanying drawings and embodiment, the present invention will be described in detail.

Figure 1:
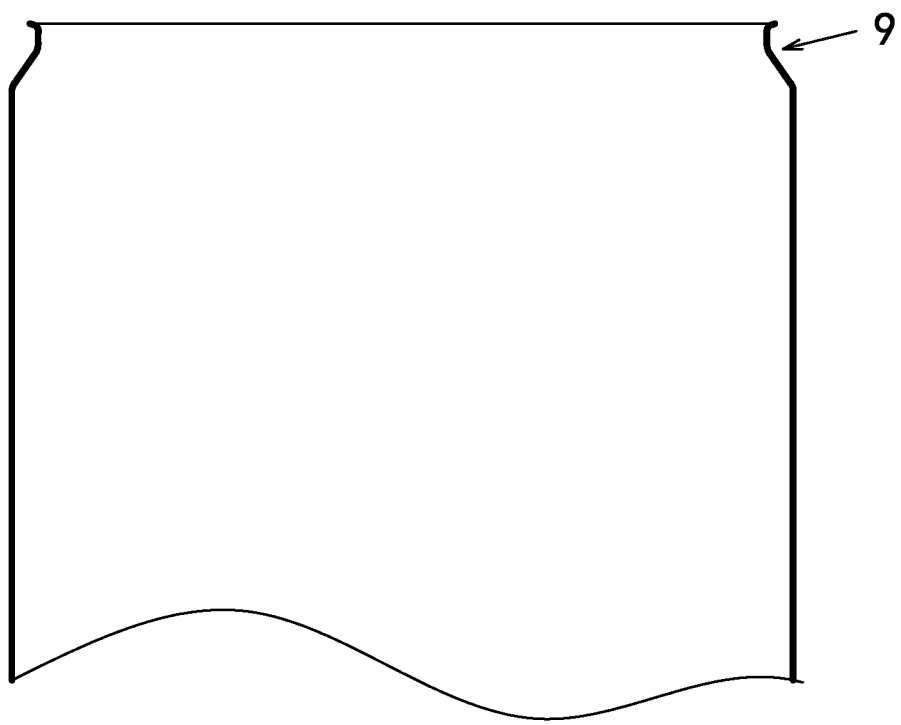
FIG. 1 is a schematic view of a can body after necking.
Figure 2:
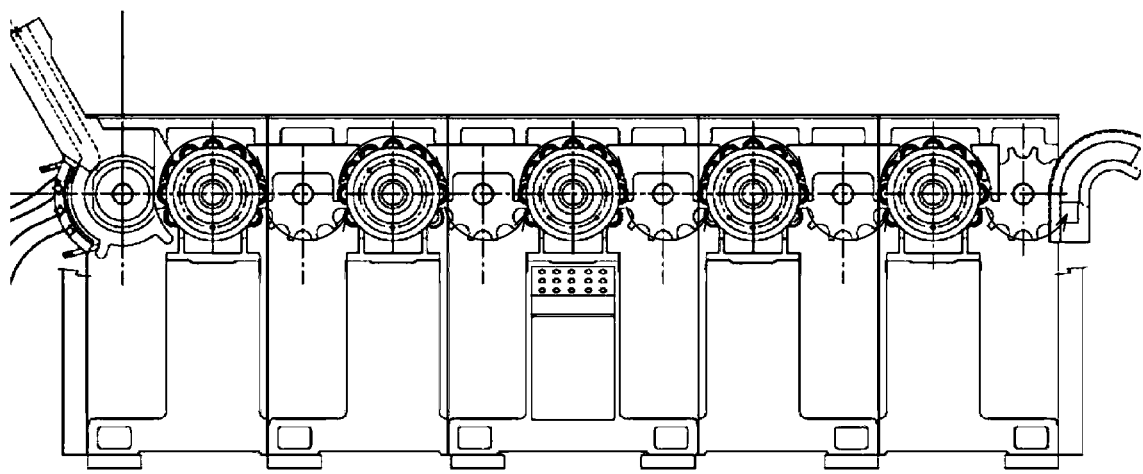
FIG. 2 is a view of prior art.
Figure 3:
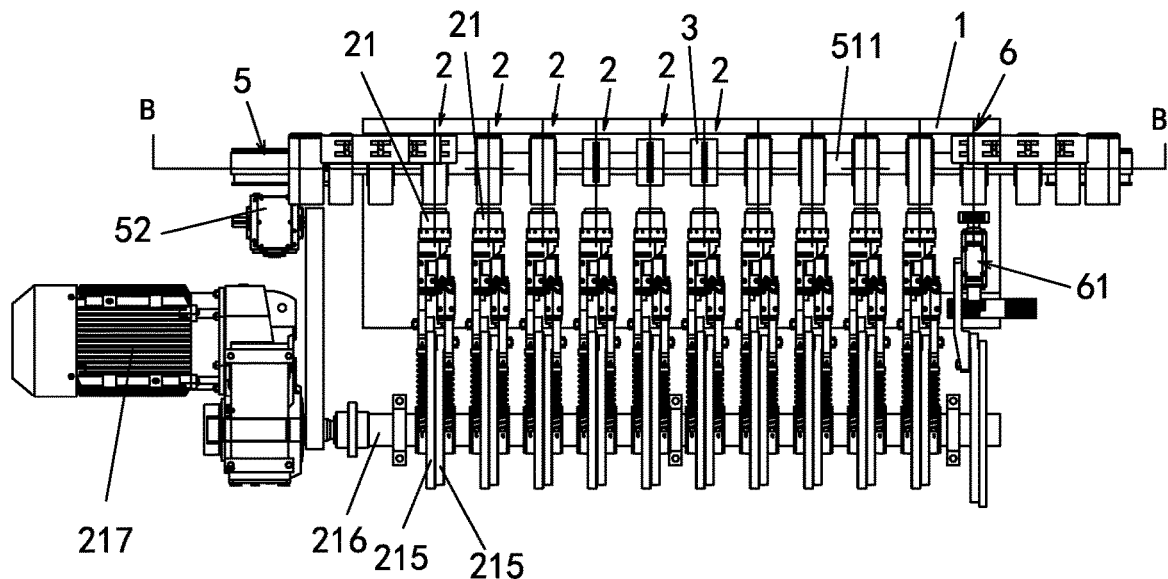
FIG. 3 is the front view of embodiment 1 of present invention.
Figure 4:
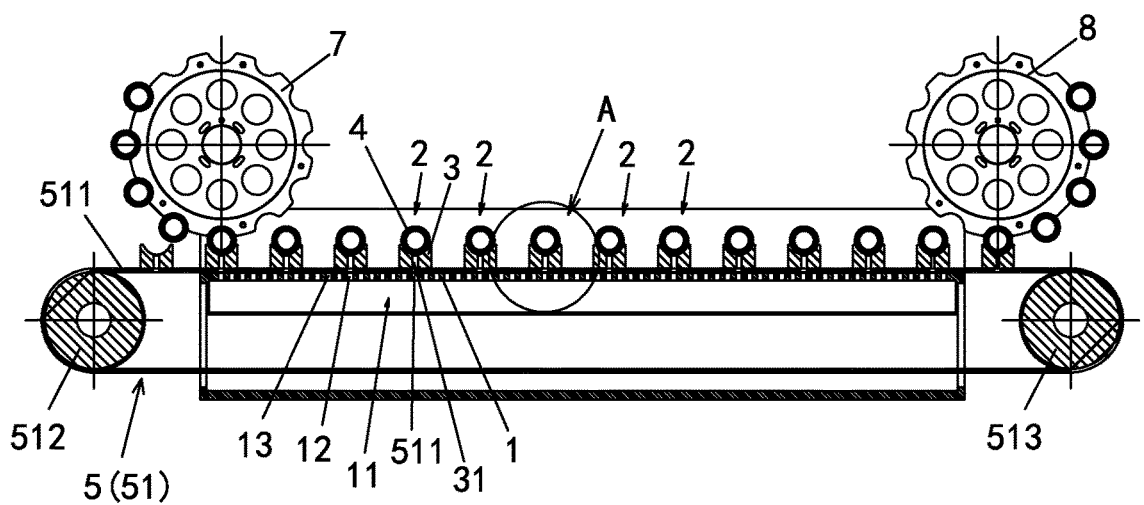
FIG. 4 B-B cross sectional view of FIG. 3.

Embodiment 1: as shown in FIG. 3~7:
A linear apparatus for forming a can opening comprises a working tabletop 1 and a plurality of necking machining stations 2 are arranged on the working tabletop 1. As shown in FIGS. 3 and 4, the specific necking machining stations 2 are 10 pieces, and each necking machining station 2 is a necking machining process, i.e. There are 10 necking machining processes and the can opening of can body 4 is extruded to form a necking through the 10 necking machining processes. The quantity of necking machining stations 2 could be changed according to the actual need.

As shown in FIG. 3~7, each necking machining station 2 is provided with a can body positioning recess 3 for positioning a can body 4, and the positioning recesses 3 for positioning can bodies are arranged in parallel along the axis of can bodies 4; the can body positioning recess 3 is internally provided with a vacuum suction hole 31, and a vacuum chamber 11 is provided below the working tabletop 1, and the vacuum chamber 11 is in communication with the vacuum suction hole 31.

Figure 7:
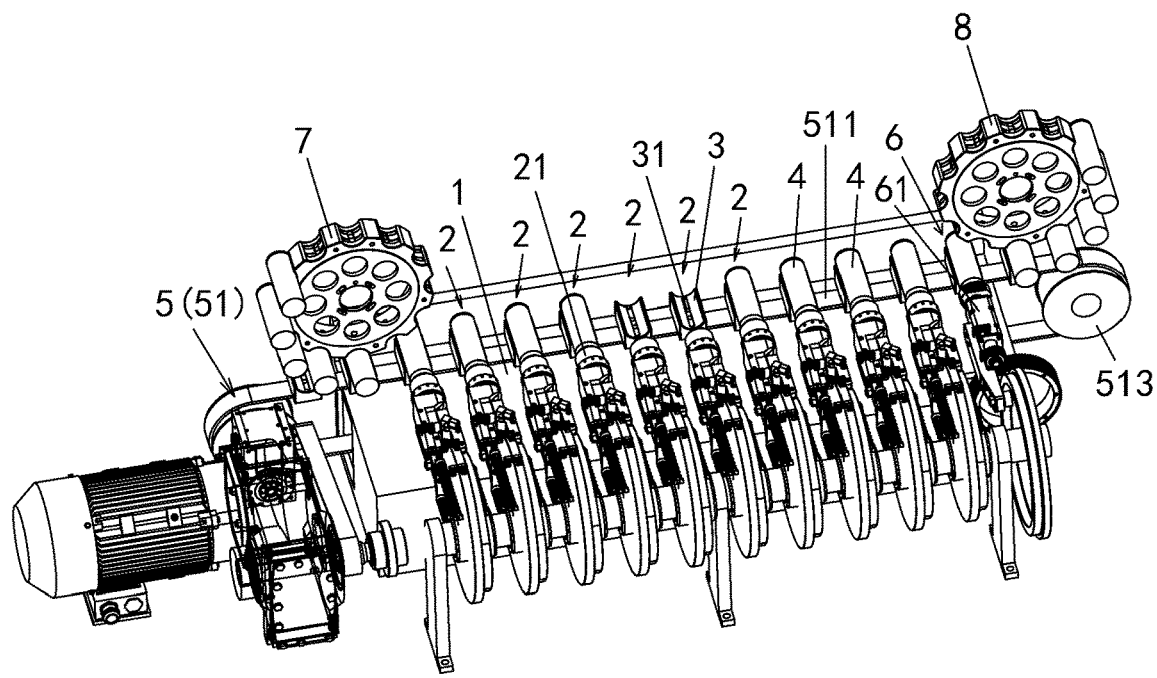
FIG. 7 is the perspective view of embodiment 1 of present invention.

As shown in FIG. 3~7, a necking machining device 21 is correspondingly arranged on each necking machining station 2 and the necking machining device 21 acts on the can opening of the can body 4 positioned in the can body positioning recess 3; the necking machining device 21 (as shown in FIGS. 3 and 7, see FIG. 6 in detail) comprises a necking internal mold 211, a necking external mold 212 sleeved on the outside of the necking internal mold 211 and the necking drive device driving the movement of necking internal mold 211 and necking external mold 212 relative to the can body 4, and the necking drive device comprises a external mold punch 213 connected with a necking external mold 212, an internal mold punch 214 connected with a necking internal mold 211 and two disk cams 215; the two disk cams 215 connect with the external mold punch 213 and internal mold punch 214 respectively and in a drive way; the disk cams 215 are sleeved on a cam shaft 216 and the cam shaft 216 is connected with a motor 217 at one end in a drive way, and the motor 217 drives the external mold 212 and internal mold 211 to move to the can opening of can body 4 and return through the disk cam 215, external mold punch 213 and internal mold punch 214.

As shown in FIGS. 3 and 7, the disk cam 215 of necking machining device 21 on each necking machining station 2 is sleeved on the same cam shaft 216 and is driven by the same motor 217. This is a preferred and most economical solution, but in practice, the disk cam 215 of necking machining device 21 on each necking machining station could be driven by the independent power device.

In addition, FIG. 3 and FIG. 7 are the examples of motor driving the disk cam 215 to drive the motion of necking external mold 212 and necking internal mold 211, but in practice, the driving by other existing drive methods is feasible, for example, the motor drives the crank block to drive the motion of necking external mold 212 and necking internal mold 211.

As shown in FIG. 3 and FIG. 7, the disk cam 215 is specifically a cam working with the external contour surface or the flange contour surface and the cam is connected with the external mold punch 213 or internal mold punch 214 in a drive way through the rollers by the contact of spring. Of course, in practice, it's also feasible to change to the following cam solution, and the disc cam could be a disc groove cam, and the external mold punch 213 or internal mold punch 214 corresponding to the cam is provided with rollers 213a, 214a, and the rollers 213a, 214a are embedded in the groove of disc groove cam for the continuous drive. In this embodiment, the disk cam 215 is used for driving, and its structure is simple, the processing is easy and the cost is greatly reduced.

The linear apparatus for forming a can opening in this embodiment further comprises a moving device 5, and the moving device 5 acts on the can body 4 positioned in the can body positioning recess 3 and is used for moving the can body 4 on the stations onward by one station. Specifically, as shown in FIG. 3, FIG. 4 and FIG. 7, the moving device 5 comprises a conveying belt device 51 and an intermittent drive device 52, and the conveying belt device 51 includes a closed loop conveying belt 511 and a driving wheel 512 and a driven wheel 513 driving the closed loop conveying belt 511; a section of rectilinear belt surface on the closed loop conveying belt 511 is superposed on the working tabletop 1 as the conveying surface and the can body positioning recess 3 is fixed on the conveying surface of the closed loop conveying belt 511. And the vacuum suction hole 31 of corresponding can body positioning recess 3 on the closed loop conveying belt 511 is provided with the through hole 5111, while the can body positioning recess 3 of corresponding necking machining station 2 on the working tabletop 1 is provided with the through hole 12, so when the can body positioning recess 3 is on the necking machining station 2, the vacuum suction hole 31 is connected with the vacuum chamber 11 through the through hole 5111 of the closed loop conveying belt 511 and through hole 12 of working tabletop 1. See FIG. 5. The intermittent drive device 52 is connected with the driving wheel 512 to move the can body positioning recess 3 and its positioned can body 4 onward by one station through the closed loop conveying belt 511.

Note that FIGS. 3, 4 and 7 only show the can body positioning recess 3 on the conveying surface of the closed loop conveying belt 511, while the can body positioning recess 3 on the other part of the closed loop conveying belt 511 is omitted. Actually the entire surface of the closed loop conveying belt 511 is fixed with the can body positioning recess 3 at intervals.

The intermittent drive device 52 could be a servo motor and could also be achieved by the various existing intermittent mechanisms driven by a power source.

Figure 5:
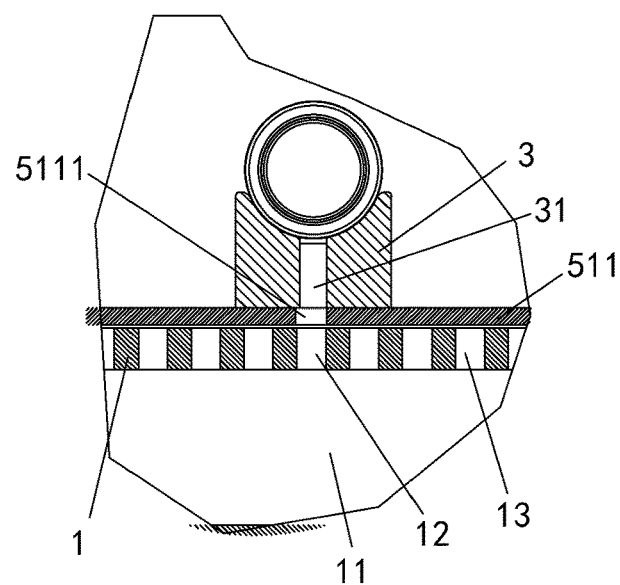
FIG. 5 is the enlarged view of area A in FIG. 4.
Figure 6:
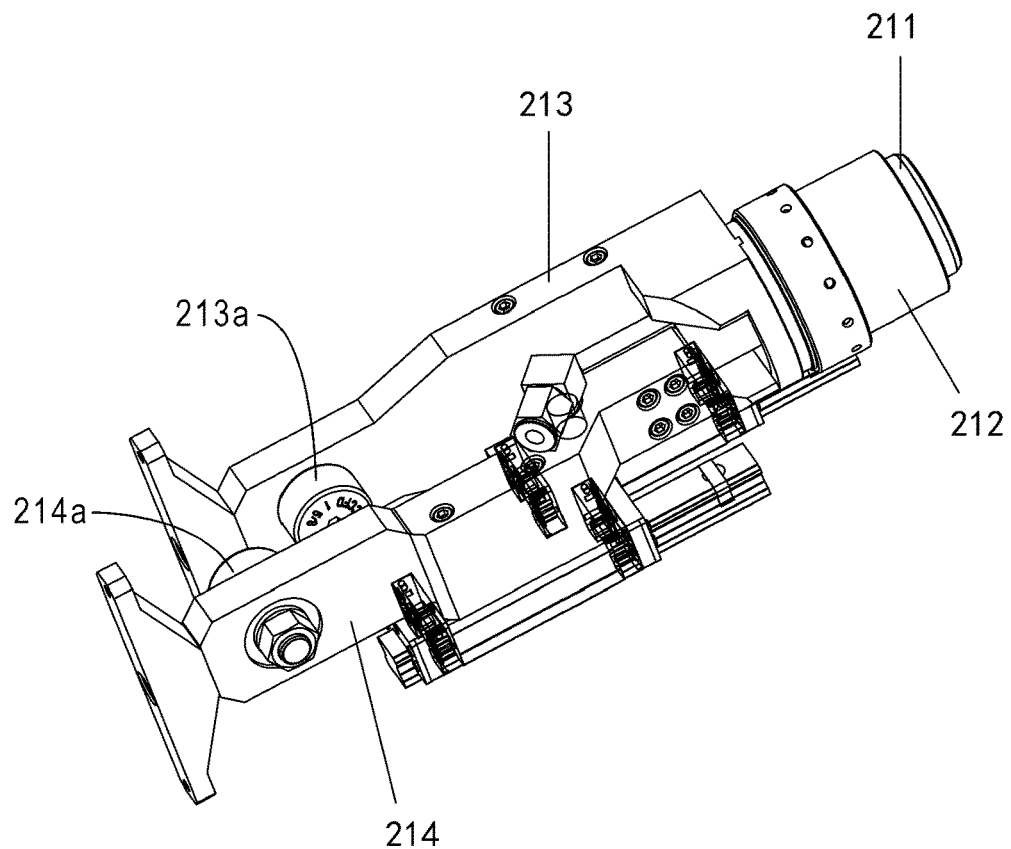
FIG. 6 is a schematic view of connection of necking internal mold, necking external mold, internal mold punch and external mold punch of necking machining device in embodiment 1 of the present invention.

As shown in FIGS. 3, 4 and 7 and see FIG. 5 in detail, a plurality of through holes 13 are also arranged between the necking machining stations 2 of the working tabletop 1, so that the vacuum suction holes 31 of can body positioning recess 3 is connected with the vacuum chamber 11 through the through holes 5111 of closed loop conveying belt 511 and through holes 12 of working tabletop 1 when the can body positioning recess 3 is located between the necking machining stations 2. This design could make the can body subject to the sucking force and positioned in the can body positioning recess 3 during the moving from the previous working station to the next working station to prevent the shifting during the moving.

In addition, as shown in FIGS. 3, 4 and 7, the working tabletop 1 is provided with a flanging machining station 6 after the necking machining stations and the flanging machining station is provided with a flanging machining device 61, and the flanging machining device comprises a flanging mold and a drive device driving the motion of the flanging mold. The addition of flanging machining station 6 is the added expanded function station after the necking process in this embodiment and the actual expanded function station may also be the curling station and the flaring station, which are available according to the customer's need.

During the operation of this embodiment, the necking machining stations 2 and the flanging machining station 6 don't have the can body 4 initially. After the equipment starts operation, the can body 4 is conveyed to the first can body positioning recess 3 at the first end of conveying belt 511 by the loading starwheel 7 and the can body 4 is fixed in the can body positioning recess 3 by the action of vacuum chamber 11 and at the same time, the conveying belt 511 moves backwards by one fixed station, and the can body positioning recess 3 and its positioned can body 4 move to the first necking machining station 2, then the necking machining device at this station acts on this can body 4 to complete the first necking machining process, and then the conveying belt 511 moves backwards by one fixed station to move the can body 4 to the second necking machining station 2 for the second necking machining process, and in the same way, the can body 4 undergoes all necking machining processes; after that, it moves to the flanging machining station 6 to undergo the flanging machining process by the flanging machining device 61 and the can body 4 is unloaded by the unloading starwheel 8. The above description is based on the machining process of a can body 4. Actually when this can body 4 is machined, the other can bodies are sequentially placed in the subsequent can body positioning recesses 3 and several can bodies are machined simultaneously in a progressive way.

In the above process, the specific movement process of necking machining device 21 on the necking machining stations 2 is as follows: after the motor 217 reduces speed by the reducer, the cam shaft 216 simultaneously drives the disk cams 215 of necking machining devices 21 on all necking machining stations 2 to rotate and the disk cams 215 finally drive the movement of necking internal mold 211 and necking external mold 212 through the internal mold punch 214 and external mold punch 213. The specific action of necking machining is as follows: the can body 4 is sucked and fixed by the vacuum chamber 11, and the necking internal mold 211 and necking external mold 212 move toward the can opening of can body 4 together, and after the necking internal mold 211 enters the can opening for some distance, the necking internal mold 211 stops, while the necking external mold 212 continues to move forward to extrude the can opening; and after the necking forming process is finished, the necking internal mold 211 and necking external mold 212 exit out of the can opening.

The embodiment has the advantages of simple structure, low cost, small occupied space and convenient maintenance, etc, and is the best choice for can body manufacturers with low production speed requirements In this embodiment, the necking drive device is an example. In practice, the necking drive device can also adopt the other solutions, for example: the necking drive device comprises the internal mold punches connected with the necking internal mold 211 and the can body punch acting on the can body 4; a linear power device drives the movement of necking internal mold 211 via the internal mold punch, and another linear power device drives the movement of can body 4 via the can body punch, while the necking external mold 212 is fixed for the relative movement of can body 4 and necking internal mold 211 and necking external mold 212.

Figure 8:
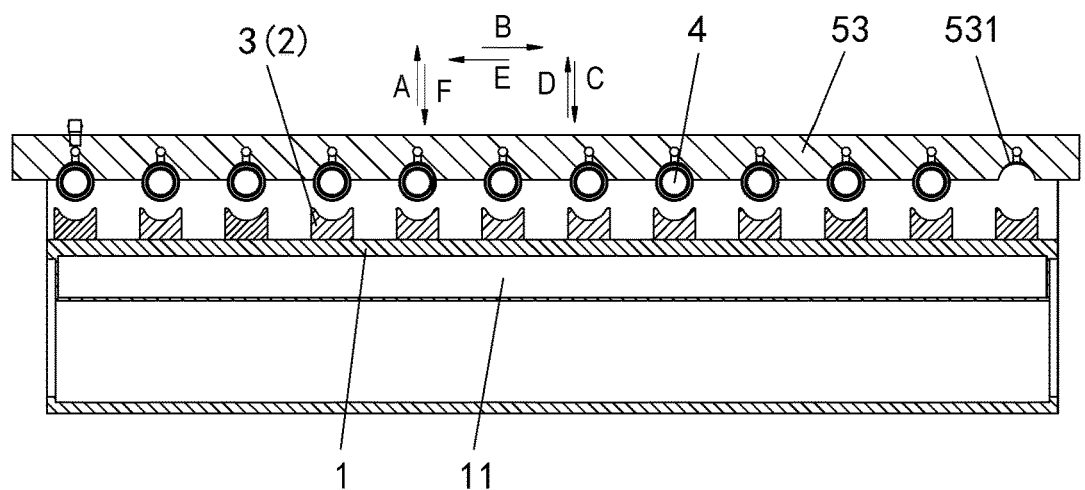
FIG. 8 is the schematic view of embodiment 2 of present invention.

Embodiment 2: as shown in FIG. 8:
A linear apparatus for forming a can opening comprises a working tabletop 1 and a plurality of necking machining stations 2 are arranged on the working tabletop 1; each necking machining station 2 is provided with several can body positioning recesses 3 for positioning the can bodies 4, and the positioning recesses 3 for positioning can bodies are arranged in parallel along the axis of can bodies 4; and the difference from the embodiment 1 is: the can body positioning recesses 3 are directly fixed on the working tabletop 1, while the moving device 5 comprises a moving action body 53, and the moving action body 53 is set across and above the can body positioning recesses 3 of the necking machining stations 2, and the moving action body 53 is provided with the pick-up sucking disc or pick-up sucking groove 531 for the can body 4 positioned by the can body positioning recess 3; in addition, the moving action body 53 is provided with a shifting device to drive the moving action body 53 to move relative to the working tabletop 1 along the arrangement direction of necking machining stations 2 and in the upward and downward direction. The specific movement of moving action body 53 is as follows: as shown by arrows in FIG. 8, it moves upward first (shown with reference "A"), and then it moves to the next station (shown with reference "B"), then moves downward (shown with reference "C"), then moves upward (shown with reference "D"), and then moves forward (shown with reference "E"), and then moves downward (shown with reference "F"), that is, the moving action body 53 moves the can bodies 4 on each station backward to the next station.

The others are the same as those in the embodiment 1 and will not be repeated herein.

Figure 9:
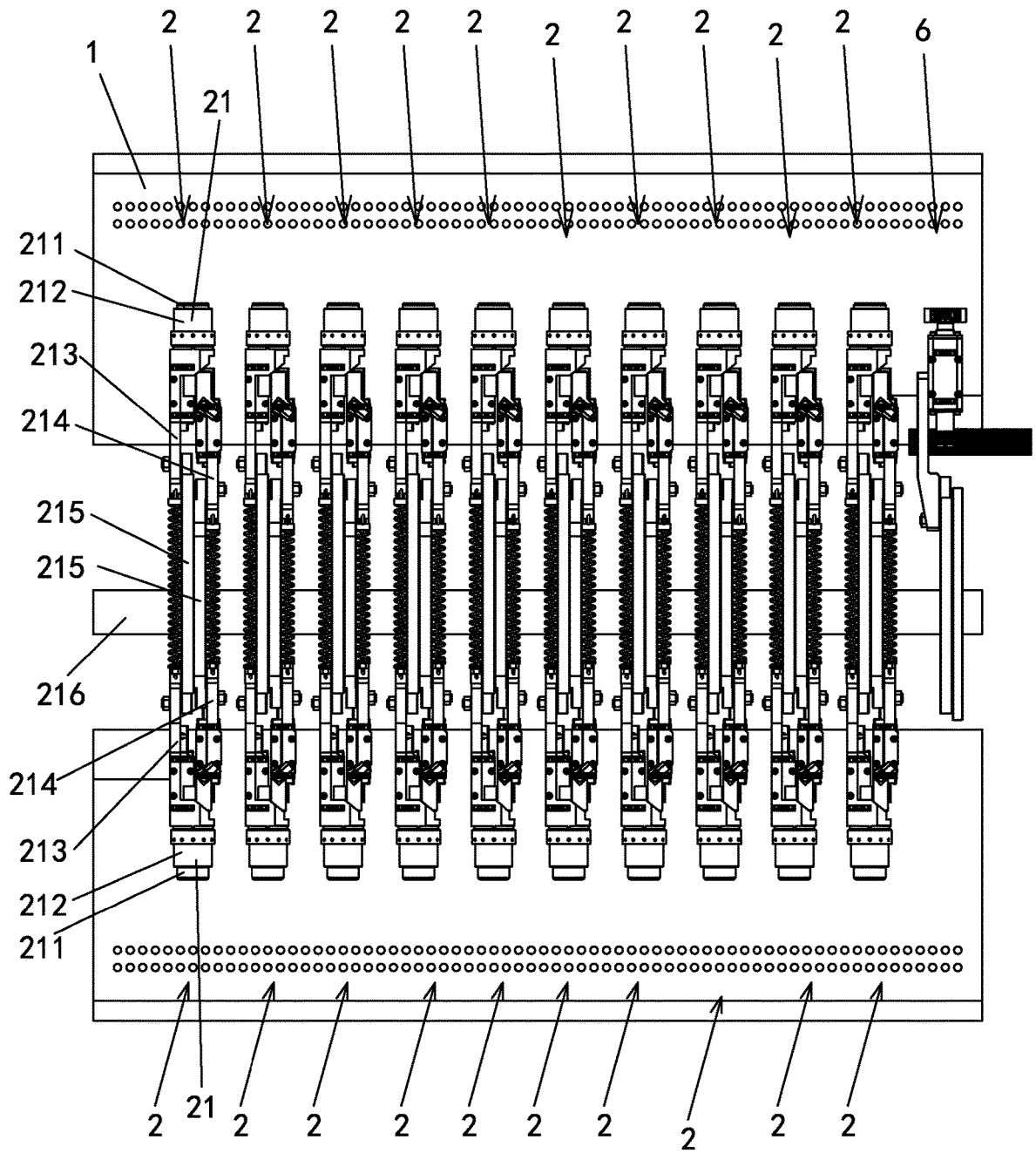
FIG. 9 is the arrangement view of necking machining device on the necking machining stations of embodiment 3 of present invention.

Embodiment 3: as shown in FIG. 9:
A linear apparatus for forming a can opening, two lines of necking machining stations 2 are arranged on two parallel lines along the working tabletop 1; each necking machining station is provided with a can body positioning recess 3 for positioning a can body (omitted and not shown in FIG. 9), and the can body positioning recesses 3 are arranged in parallel along the axis of can bodies 4; the can body positioning recess 3 is internally provided with a vacuum suction hole 31 (omitted and not shown in FIG. 9), and a vacuum chamber 11 is provided below the working tabletop 1, and the vacuum chamber 11 is in communication with the vacuum suction hole 31.

As shown in FIG. 9, each necking machining station 2 is provided with a necking machining device 21, and the necking machining device 21 is located between the can body positioning recesses 3 of two lines of necking machining stations 2, and the necking machining devices 21 of two lines of necking machining stations 2 are one-to-one correspondence.

The necking machining device 21 comprises a necking internal mold 211, a necking external mold 212 sleeved on the outside of the necking internal mold 211, a external mold punch 213 connected with a necking external mold 212 and an internal mold punch 214 connected with a necking internal mold 211; two disk cams 215 are established between each pair of necking machining devices 21 corresponding to the two lines of necking machining stations 2, and the two disk cams 215 are isodiametric disk cams 215. In the two isodiametric disk cams, one isodiametric disk cam 215 is corresponding to the external mold punch 213 of two necking machining devices 21 and connected with it in a drive way; the other isodiametric disk cam 215 is corresponding to the internal mold punch 214 of two necking machining devices 21 and connected with it in a drive way. In addition, the disk cams 215 are sleeved on a cam shaft 216 and the cam shaft 216 is connected with a motor 217 at one end in a drive way, and the motor drives the necking external mold 212 and necking internal mold 211 of two corresponding necking machining devices 21 of the two lines of necking machining stations 2 to move to the can body 4 in the can body positioning recess 3 of respective necking machining station 2 and return through the disk cam.

The disk cam 215 is the isodiametric disk cam, and the characteristics of the isodiametric disk cam determine that the tension provided by the spring to the follower is constant throughout the entire work cycle, and this characteristic also ensure the smoothness of cam follower system during the operation and allows the operation at higher speed.

The two lines of necking machining stations 2 in this embodiment could be connected in parallel and also be in series in the process.

The linear apparatus for forming a can opening in this embodiment further comprises a moving device 5, and the moving device 5 acts on the can body 4 positioned in the can body positioning recess 3 and is used for moving the can body 4 on the stations onward by one station, and the specific structure and change of moving device 5 are the same as that in the embodiment 1 and 2.

It should be noted that the above described embodiments are only for illustration of technical concept and characteristics of present invention with purpose of making those skilled in the art understand the present invention, and thus these embodiments shall not limit the protection range of present invention. The equivalent changes or modifications according to spiritual essence of present invention shall fall in the protection scope of present invention.

The invention claimed is:

1. A linear apparatus for forming a can opening, comprising:
   a working tabletop;
   a plurality of necking machining stations arranged along a line on the working tabletop, each necking machining station is provided with a can body positioning recess for positioning a can body, and each positioning recess for positioning the can body is arranged in parallel along an axis of the can body,
   wherein the can body positioning recess is internally provided with a vacuum suction hole, a vacuum chamber is provided below the working tabletop, and the vacuum chamber is in communication with the vacuum suction hole;
   wherein a corresponding necking machining device is arranged on each of the plurality of necking machining stations, and each necking machining device acts on the can opening of the can body positioned in the can body positioning recess,
   wherein each of the necking machining devices comprises a necking internal mold, a necking external mold sleeved on an outside of the necking internal mold, and a necking drive device driving a movement of the necking internal mold and the necking external mold relative to the can body; and
   wherein the moving device is configured to act on the can body when the can body is positioned in the can body positioning recess, and the moving device is configured to move the can body from one of the plurality of necking machining stations to a next of the plurality of necking machining stations.

2. The linear apparatus for forming the can opening of claim 1, wherein the necking machining device further comprises:
   an external mold punch connected with the necking external mold; and
   an internal mold punch connected with the necking internal mold, and two disk cams,
   wherein the two disk cams connect with the external mold punch and the internal mold punch respectively,
   wherein the disk cams are sleeved on a cam shaft and the cam shaft is connected with a motor at one end, and the motor drives the necking external mold and the necking internal mold to move to the can opening of the can body and to return through: (a) the disk cam, (b) the external mold punch and (c) the internal mold punch.

3. The linear apparatus for forming the can opening of claim 2, wherein the disk cams are cams having a cam working surface that is an external contour working surface or a flange contour working surface, the internal and external mold punches corresponding to the cam are provided with rollers, and the rollers are kept in contact with the cam working surface through a spring force for a continuous drive.

4. The linear apparatus for forming the can opening of claim 2, wherein each disk cam is a disk groove cam, the external mold punch or the internal mold punch corresponding to the each disk cam is provided with rollers, and the rollers are embedded in the groove of the disc groove cam for a continuous drive.

5. The linear apparatus for forming the can opening of claim 1, wherein:
   the moving device comprises a conveying belt device and an intermittent drive device, the conveying belt device including a closed loop conveying belt and a driving wheel and a driven wheel driving the closed loop conveying belt,
   a section of a rectilinear belt surface on the closed loop conveying belt is superposed on the working tabletop as a conveying surface, and a belt can body positioning recess is fixed on the conveying surface of the closed loop conveying belt,
   the vacuum suction hole of the belt can body positioning recess is provided with a first through hole on the closed loop conveying belt, while the can body positioning recess of a corresponding necking machining station on the working tabletop is provided with a second through hole, so when the belt can body positioning recess is on the corresponding necking machining station, the vacuum suction hole is connected with the vacuum chamber through the first through hole of the closed loop conveying belt and the second through hole of the working tabletop, and
   wherein the intermittent drive device is connected with the driving wheel to move the can body positioning recess and the can body from one of the plurality of necking machining stations to a next of the plurality of necking machining stations through the closed loop conveying belt.

6. The linear apparatus for forming the can opening of claim 5, further comprising a plurality of third through holes are arranged between each necking machining station of the working tabletop, so that the vacuum suction holes of the can body positioning recess are connected with the vacuum chamber through the through holes of the closed loop conveying belt and the through holes of the working tabletop when the can body positioning recess is located between the necking machining stations.

7. The linear apparatus for forming the can opening of claim 1, wherein:
   the moving device comprises a moving action body, and the moving action body is set across and above the can body positioning recess of the necking machining stations, and the moving action body is provided with a pick-up sucking disc or pick-up sucking groove for the can body positioned by the can body positioning, and the moving action body is configured to drive the moving action body to move relative to the working tabletop along an arrangement direction of the necking machining stations and in an upward and downward direction.

8. A linear apparatus for forming a can opening, comprising:
   a working tabletop;
   two lines of necking machining stations arranged on two parallel lines along the working tabletop,
   wherein each necking machining station is provided with a can body positioning recess for positioning a can body, and each positioning recess for positioning the can body is arranged in parallel along an axis of the can body, wherein the can body positioning recess is internally provided with a vacuum suction hole, a vacuum chamber is provided below the working tabletop, and the vacuum chamber is in communication with the vacuum suction hole, wherein each necking machining station is provided with a necking machining device, and each necking machining device is located between the can body positioning recess of the two lines of necking machining stations;

wherein each necking machining device comprises a necking internal mold, a necking external mold sleeved on an outside of the necking internal mold, an external mold punch connected with the necking external mold and an internal mold punch connected with the necking internal mold, two disk cams are established between each pair of the necking machining devices corresponding to the two lines of the necking machining stations, the two disk cams are isodiametric disk cams, one isodiametric disk cam is corresponds to the external mold punch of the two necking machining devices and is connected thereto; the other isodiametric disk cam corresponds to the internal mold punch of the two necking machining devices and is connected thereto, wherein the two disk cams are sleeved on a cam shaft and the cam shaft is connected with a motor at one end, and the motor drives the necking external mold and the necking internal mold of the two corresponding necking machining devices of the two lines of necking machining stations to move to the can body in the can body positioning recess of a respective necking machining station and to return through the disk cam; and a moving device, wherein the moving device is configured to act on the can body when the can body is positioned in the can body positioning recess, and the moving device is configured to move the can body from one of the two necking machining stations to a next of the two necking machining stations.

* * * * *